May 30, 1967  S. CARDINALE  3,321,996

DUAL ACTION COLLAPSIBLE STEERING WHEEL

Filed June 8, 1966

United States Patent Office 3,321,996
Patented May 30, 1967

3,321,996
DUAL ACTION COLLAPSIBLE STEERING WHEEL
Salvatore Cardinale, 2454 Riverside Drive,
Belimore, N.Y. 11710
Filed June 8, 1966, Ser. No. 556,089
3 Claims. (Cl. 74—552)

ABSTRACT OF THE DISCLOSURE

In abstract, this invention comprises a steering wheel for automobiles and the like that upon body impact collapses in a two stage manner. The steering wheel of this invention includes springy spokes attached to a steering column, a steering wheel made up of segments between the spokes comprising a linear resilient element, said wheel having a barrel sleeve assembly at each spoke to permit a predetermined amount of wheel movement before a resistant engagement of the linear element is effected.

---

This invention relates to a novel steering wheel for automobiles and other transportation devices and more particularly to steering wheels adapted to collapse in a predetermined manner.

Many automobile accidents result in body contact or even impalement of the driver upon the steering wheel.

It is an object of this invention to provide a steering wheel that is adapted to collapse in a dual or two-stage predetermined manner so as to exert a maximum cushion effect on the driver.

It is another object to provide a collapsible steering wheel having a two stage collapse feature so that for minor accidents only the first stage of collapse may be operable.

Figure 1:
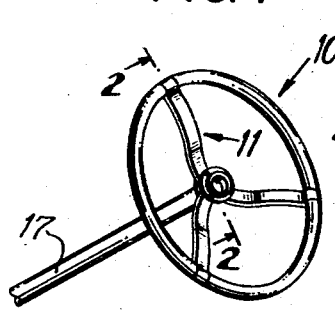
Figure 4:
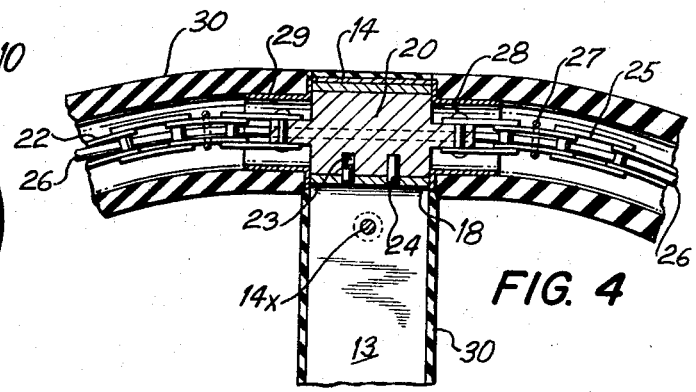
Figure 2:
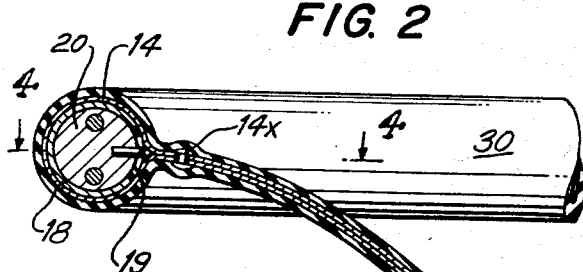
Figure 6:
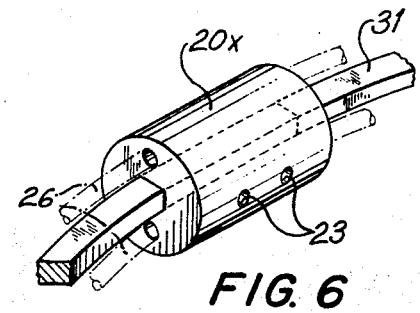
Figure 5:
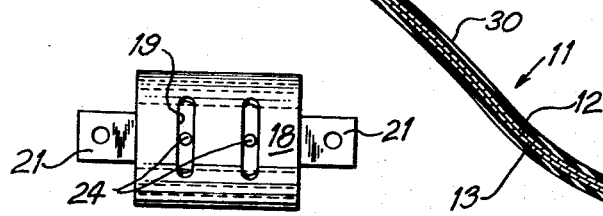
Figure 3:
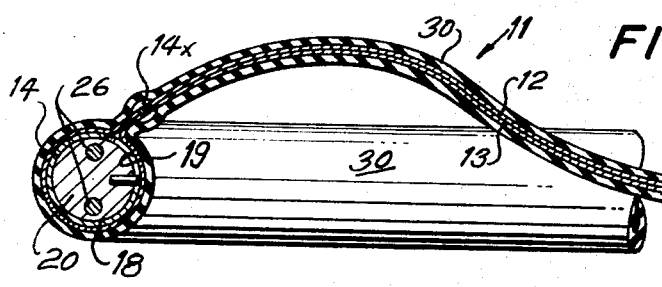
Figure 3:
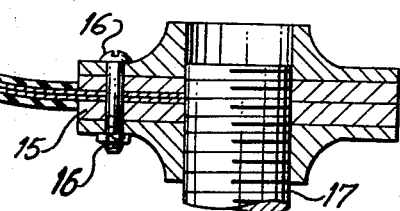

These and other objects of this invention will become apparent upon reading the following descriptive disclosure of a plurality of embodiments thereof taken in conjunction with the accompanying drawing in which;

FIG. 1 is a perspective view of the steering wheel mounted on a steering column, FIG. 2 is a section view taken on line 2—2 of FIG. 1, with the wheel in normal driving position, FIG. 3 is a view similar to that of FIG. 2 but showing the wheel rim collapsed so as to engage the second stage of the collapse resistance of the wheel, FIG. 4 is a section view taken on line 4—4 of FIG. 2 and is one form of the invention wherein a modified bicycle chain means is used to accomplish the effect of the second stage, FIG. 5 is a front view of the barrel and co-acting cylinder sleeve for effecting a pre-determined pre-selected resistance to the first stage of collapse, and FIG. 6 is a perspective view of a modified wheel wherein the chain means of the device of FIG. 4 is substituted by an integral rim of rectangular cross section.

Turning to the drawing, the wheel 10 is provided with a plurality of leaf spring spokes 11. The spokes 11 are each made from a single flat spring strip of sheet metal bent suitably to form a pair of overlapping arms 12 and 13 each connected at one end integrally to form a substantially cylindrical loop 14 tightly held by rivet 14X. The free overlapping ends of the arms 12 and 13 are each provided with an aperture. These free ends are disposed between suitable washers 15 and secured by means of a bolt and nut combination 16 to the steering column 17. Other conventional means for securing the free ends of the spring spoke 11 to the column 17 are operable.

An important feature of this invention is the provision of a barrel sleeve assembly captively in the loop 14 of each spoke 11. As shown in FIGS. 2 to 5, a cylindrical preferably metal sleeve 18 is provided with at least one but preferably two suitably long slot apertures 19. The cylindrical barrel 20, preferably also of metal, is provided with a pair of opposed apertured lugs 21 adapted to engage sections of modified bicycle chain 22.

The diameter of the barrel 20 is such as to fit closely yet movably within sleeve 18.

The barrel 20 is provided with suitable round cavities 23 each adapted to be disposed below a respective slot 19 of a sleeve 18 and a suitably short pin 24 is press fitted into each cavity 23 and extends suitably into the slot 19 so as to limit the rotational movement of the sleeve 18 relative to the barrel 20.

The second stage of the collapse resistance is effected by circular resilient means co-acting with the barrels 20. There are several ways of producing the above stated circular suitably yieldable resistance means. The circular yieldable means must be sufficiently rigid to constitute a firm rim of a driving wheel, yet it is sufficiently spring yieldable, according to this invention, to bend under stress along the rim where hit and to return to its normal configuration after being hit.

In FIG. 4 is shown one manner of obtaining a wheel having firm yet suitably yieldable springy rim.

The rim (FIG. 4) employs a bicycle chain the links 25 of which have been suitably curved to allow the chain 22 to assume the circumference of the wheel. To support the chain 22 and to give a springy effect to the rim, a pair of circular integral spaced-apart springs 26 are disposed in the rim. These springs 26 are of rod cross section and pass into suitable apertures located in the barrels 20. The springs 26 are each disposed opposedly and suitably adjacent to the chain 22 and are secured to the chain by staples 27 so that the springs and the chain function as a unit. The chain sections between each pair of barrels 20 is secured to the integral lugs 21 of barrels 20 by means of a bolt or rivet 28. A collar 29 is disposed over each lug 21 and a rubber or plastic tubular cover 30 is used to cover the chain assembly and spokes 11.

Another manner of accomplishing a firm yet yieldable springy steering rim is shown in FIG. 6. In this modification a unitary central spring 31 of suitably rectangular cross section is used in lieu of the bicycle chain. As shown in FIG. 6, the modified barrles 20X are each provided with a central hole through which the steel spring 31 passes. The spring 31 is welded at its ends to form a circle.

Also as shown in FIG. 6, the barrels 20X are provided with a pair of circular springs 26 to obtain a desirable spring return of a temporarily deformed rim as in the case of an accident. Clearly, the rim of this invention is only temporarily deformed on impact and resumes its original qualities and configuration as a steering wheel automatically after impact.

While the barrel 20X is preferably provided with a pair of spaced-apart springs 26 to give bulk for gripping as a handle, it is obvious that a single circular spring 31 of suitable rectangular cross section is operable when used alone. Preferably the spring 31 of rectangular cross section is not of square cross section but rather one having the long dimension of the rectangle in the circular plane of the rim and thus at a right angle to the axis of the steering column 17.

In the operation of this invention the sleeves 18 are inserted in the loops 14 of the spring 11. Next the barrels, 20 or 20X are inserted into the sleeves 18 with the cavities 23 being located below the slots 19. Next, the pins 24 are inserted into the cavities 23 and below the outside surface of the sleeve (FIG. 4) at a pre-selected location of the barrel cavity relative to the length of the slot 19. Generally, the sleeve 18 captively held by loop 14 of the spring 11 in normal driving position receives the barrel 20 with the pin 24 disposed half way between either end of its co-acting slot 19. In this position the rim of the wheel 10 can move downwardly against the force of only the spring spokes 11 about twenty degrees or so since the sleeve will rotate this amount against the barrel 20 held against rotation by the circular spring means of the wheel rim.

Further downward movement of the wheel rim now exerts a pressure against the circular spring means 31 or the bicycle chain 20 co-acting with the pair of springs 26 since the pin 24 now engages the end wall of the slot 19 and the sleeve 18 and barrel 20 act as a unit.

In effect a mild accident may have its impact absorbed by one or more leaf springs 11. But a severe accident would bring into action the spring resistance effect of the circular rim spring where the impact occurred as well as that of the leaf springs.

This invention is clearly of a broad scope and thus is not to be limited to the illustrative embodiments shown and described herein.

I claim:

1. A plural stage yieldable spring return steering wheel for vehicles comprising a circular rim having a plurality of sections of curved link bicycle chain; a barrel sleeve assembly disposed between and secured to adjacent chain sections; a spring spoke secured to each barrel sleeve assembly fixedly engaging a sleeve at one end and a steering column at the other; and a pair of circular rod springs disposed in the wheel rim in opposed relationship about said chain and passing through spaced apart apertures disposed in said barrels.

2. The steering wheel of claim 1 comprising said barrels having at least one cavity in the cylindrical surface thereof, said sleeves having a suitably long slot disposed over each of said cavities; and a pin secured in said cavity and extending into said sleeve whereby a limited rotation of said sleeve on a co-acting barrel is produced.

3. A plural stage yieldable spring return steering wheel for vehicles comprising a circular rim having therein a circular spring of rectangular cross section; a plurality of spaced-apart barrel sleeve assemblies disposed on said spring; a spring spoke fixedly secured to the sleeve of each assembly at one end and to the steering column at the other; said barrels having at least one cavity in the cylindrical surface thereof, said sleeves having a suitably long slot disposed over each of said cavities; and a pin secured in said cavity and extending into said sleeve whereby a limited rotation of said sleeve on a co-acting barrel is produced.

References Cited
UNITED STATES PATENTS

| | | | |
|---|---|---|---|
| 2,179,013 | 11/1939 | Kaye | 74—552 |
| 2,210,232 | 8/1940 | Crockett | 74—552 |
| 2,954,708 | 10/1960 | Huzzard | 74—552 |

FRED C. MATTERN, Jr., *Primary Examiner.*